US012673669B2

(12) United States Patent
Kinugawa et al.

(10) Patent No.: US 12,673,669 B2
(45) Date of Patent: Jul. 7, 2026

(54) VEHICLE CONTROL APPARATUS

(71) Applicants: DENSO CORPORATION, Kariya-city (JP); TOYOTA JIDOSHA KABUSHIKI KAISHA, Toyota (JP)

(72) Inventors: Takaomi Kinugawa, Kariya-city (JP); Tooru Takahashi, Kariya-city (JP); Yuki Tezuka, Toyota (JP); Naoki Kusumoto, Toyota (JP)

(73) Assignees: DENSO CORPORATION, Kariya-city (JP); TOYOTA JIDOSHA KABUSHIKI KAISHA, Toyota (JP)

( * ) Notice: Subject to any disclaimer, the term of this patent is extended or adjusted under 35 U.S.C. 154(b) by 212 days.

(21) Appl. No.: 18/485,234

(22) Filed: Oct. 11, 2023

(65) Prior Publication Data

US 2024/0034314 A1     Feb. 1, 2024

Related U.S. Application Data

(63) Continuation of application No. PCT/JP2022/015210, filed on Mar. 28, 2022.

(30) Foreign Application Priority Data

Apr. 13, 2021     (JP) ................................. 2021-067703

(51) Int. Cl.
*B60W 30/09* (2012.01)
*B60W 30/095* (2012.01)
*G06V 20/58* (2022.01)

(52) U.S. Cl.
CPC ........ *B60W 30/09* (2013.01); *B60W 30/0956* (2013.01); *G06V 20/584* (2022.01); *B60W 2554/80* (2020.02)

(58) Field of Classification Search
CPC .............. B60W 30/09; B60W 30/095; B60W 30/0953; B60W 30/0956; B60W 30/16
See application file for complete search history.

(56) References Cited

U.S. PATENT DOCUMENTS

2004/0249546 A1    12/2004   Zielke
2009/0157286 A1     6/2009   Saito et al.
(Continued)

FOREIGN PATENT DOCUMENTS

JP          2002104015  A      4/2002
JP          2009003795  A      1/2009
(Continued)

*Primary Examiner* — Anshul Sood
(74) *Attorney, Agent, or Firm* — Precision Patents, P.C.

(57)     ABSTRACT

A vehicle control apparatus for a vehicle includes a monitoring sensor and a brake apparatus. The vehicle control apparatus determines whether a pre-preceding vehicle is present in front of a preceding vehicle in front of an own vehicle in a vehicle advancing direction. In response to the pre-preceding vehicle is determined to be present in front of the preceding vehicle, the vehicle control apparatus compares a first required deceleration required to cause the own vehicle to travel to follow the preceding vehicle based on a monitoring result of the monitoring sensor and a second required deceleration required to cause the own vehicle to travel to follow the pre-preceding vehicle based on a monitoring result of the monitoring sensor, and controls the brake apparatus to bring deceleration of the own vehicle closer to the second required deceleration in response to the second required deceleration being greater than the first required deceleration.

8 Claims, 11 Drawing Sheets

(56) References Cited

U.S. PATENT DOCUMENTS

| | | | | |
|---|---|---|---|---|
| 2013/0218433 A1* | 8/2013 | Matsuno | ................ | G06V 20/58 |
| | | | | 701/70 |
| 2015/0266473 A1* | 9/2015 | Hayasaka | ............. | B60W 30/09 |
| | | | | 701/70 |
| 2018/0281791 A1 | 10/2018 | Fukaya et al. | | |
| 2019/0180629 A1 | 6/2019 | Kim | | |
| 2020/0238988 A1 | 7/2020 | Fukaya et al. | | |

FOREIGN PATENT DOCUMENTS

| | | | |
|---|---|---|---|
| JP | 2013061274 A | 4/2013 |
| JP | 2018165085 A | 10/2018 |

* cited by examiner

VEHICLE CONTROL APPARATUS

CROSS-REFERENCE TO RELATED APPLICATION

The present application is a continuation application of International Application No. PCT/JP2022/015210, filed on Mar. 28, 2022, which claims priority to Japanese Patent Application No. 2021-067703, filed on Apr. 13, 2021. The contents of these applications are incorporated herein by reference in their entirety.

BACKGROUND

Technical Field

The present disclosure relates to a vehicle control apparatus.

Related Art

A vehicle control apparatus that uses radar waves to detect a preceding vehicle traveling ahead of an own vehicle and a pre-preceding vehicle traveling ahead of the preceding vehicle has been known. This vehicle control apparatus performs following-travel control to cause the own vehicle to travel so as to follow the preceding vehicle or the pre-preceding vehicle based on the detection of the preceding vehicle and the pre-preceding vehicle by the radar waves.

SUMMARY

One aspect of the present embodiment provides a vehicle control apparatus that is applicable to a vehicle including a monitoring sensor that monitors a front side of an own vehicle in a vehicle advancing direction and a brake apparatus that brakes the own vehicle. The vehicle control apparatus determines whether a pre-preceding vehicle is present in front of a preceding vehicle in front of the own vehicle in the vehicle advancing direction. In response to the pre-preceding vehicle is determined to be present in front of the preceding vehicle, the vehicle control apparatus compares a first required deceleration required to cause the own vehicle to travel so as to follow the preceding vehicle based on a monitoring result of the monitoring sensor and a second required deceleration that is deceleration required to cause the own vehicle to travel so as to follow the pre-preceding vehicle based on a monitoring result of the monitoring sensor, and controls the brake apparatus to bring deceleration of the own vehicle closer to the second required deceleration in response to the second required deceleration being greater than the first required deceleration.

DESCRIPTION OF THE EMBODIMENTS

Figure 1:
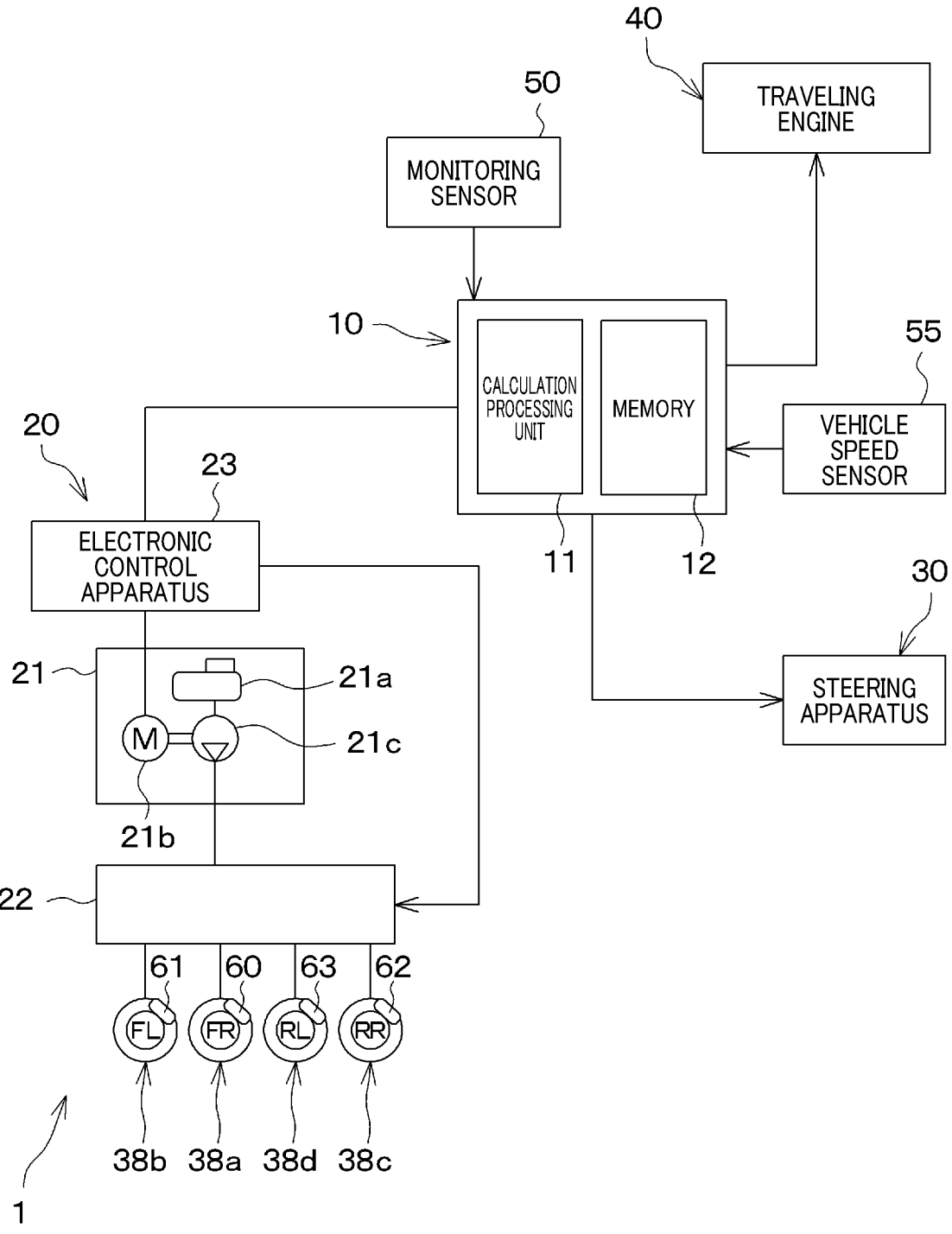
FIG. 1 is a diagram of an overall configuration of a vehicle control system to which a vehicle control apparatus according to a first embodiment is applicable.

Conventionally, a vehicle control apparatus that detects a preceding vehicle traveling ahead of an own vehicle using radar waves and detects a pre-preceding vehicle traveling ahead of the preceding vehicle using radar waves that pass under the preceding vehicle has been proposed (for example, refer to JP 2013-061274 A). This vehicle control apparatus performs following-travel control to cause the own vehicle to travel so as to follow the preceding vehicle or the pre-preceding vehicle based on the detection of the preceding vehicle and the pre-preceding vehicle by the radar waves.

In a vehicle control apparatus in JP 2018-165085 A, following-travel control to cause an own vehicle to travel so as to follow a preceding vehicle and collision-avoidance deceleration control for avoiding a collision of the own vehicle with the preceding vehicle and the like are proposed.

In following-travel control, deceleration control or acceleration control is performed on the own vehicle, and the own vehicle is thereby caused to travel so as to follow the preceding vehicle.

In collision-avoidance deceleration control, a predicted collision time that is predicted to be required for the own vehicle to collide with the preceding vehicle is calculated. Whether the predicted collision time is less than a threshold is determined, and whether an execution condition for deceleration control in which braking force is applied to the own vehicle is met is thereby determined.

For example, when deceleration control through following-travel control is being performed, if the execution condition for deceleration control is determined to be met, the vehicle control apparatus cancels following-travel control and performs deceleration control through collision-avoidance deceleration control.

In the vehicle control apparatus in JP 2018-165085 A, when the execution condition for deceleration control is met while deceleration control through following-travel control is being performed, and following-travel control is canceled, the own vehicle avoiding the pre-preceding vehicle by steering is proposed instead of deceleration control through collision-avoidance deceleration control.

With reference to above-described JP 2013-061274 A, the inventors of the present invention have examined a state in which, when the own vehicle is caused to travel so as to follow the preceding vehicle by following-travel control, the pre-preceding vehicle that cannot be recognized by an image sensor or visually from the own vehicle due to being blocked by the preceding vehicle is stationary ahead of the preceding vehicle.

In this state, radar waves that pass under the preceding vehicle are used in the vehicle control apparatus in above-described JP 2013-061274 A. Therefore, when the pre-preceding vehicle is stationary, whether the pre-preceding vehicle is actually a vehicle for which collision avoidance should be performed or an on-road structure for which collision avoidance should not be performed cannot be determined.

As a result, when the pre-preceding vehicle is detected by, for example, an image sensor when the preceding vehicle starts steering avoidance of the pre-preceding vehicle, control to decelerate the own vehicle is required at an early stage. Therefore, when required deceleration in following-travel control for the pre-preceding vehicle is determined to be greater than required deceleration in following-travel control for the preceding vehicle, control to start deceleration control of the own vehicle in correspondence to the pre-preceding vehicle is required.

At this time, if a timing at which the preceding vehicle starts steering avoidance of the pre-preceding vehicle is late, or in a scene in which a relative speed between the own vehicle and the pre-preceding vehicle is great, deceleration is insufficient in following-travel control.

In general, a maximum value of the required deceleration in collision-avoidance deceleration control is greater than a maximum value of the required deceleration in following-travel control. In collision-avoidance deceleration control, required deceleration that is greater than zero is required when an estimated collision time of the own vehicle to the pre-preceding vehicle is equal to or less than a predetermined value. Therefore, when the own vehicle approaches the pre-preceding vehicle, the required deceleration in collision-avoidance deceleration control is greater than the required deceleration in following-travel control.

As a result, in the above-described scene, transition from following-travel control to collision-avoidance deceleration control is required. Therefore, when the required deceleration in collision-avoidance deceleration control is greater than the required deceleration in following-travel control, control to start collision-avoidance deceleration control is required.

However, in the above-described vehicle control apparatus in JP 2018-165085 A, control to start collision-avoidance deceleration control when the required deceleration in collision-avoidance deceleration control is greater than the required deceleration in following-travel control is not described.

Here, deceleration is a value indicating a rate of change in speed per unit time when the speed decreases. Deceleration is expressed by a positive value. Deceleration increases as a braking force acting on the own vehicle increases. The required deceleration is a target value of deceleration of the own vehicle required in collision-avoidance deceleration control or following-travel control.

Furthermore, in the vehicle control apparatus in JP 2018-165085 A, when the own vehicle avoids the preceding vehicle (that is, a target object) in front of the own vehicle by steering, if following-travel control causes significant deceleration of the own vehicle before steering avoidance, the speed of the own vehicle may become too low. In this case, a risk of the own vehicle colliding with a following vehicle increases.

A first exemplary object of the present disclosure is to provide a vehicle control apparatus that, when determined that required deceleration in following-travel control for a pre-preceding vehicle is greater than required deceleration in following-travel control for a preceding vehicle, starts deceleration control of an own vehicle in correspondence to the pre-preceding vehicle.

A second exemplary object of the present disclosure is to provide a vehicle control apparatus that starts collision-avoidance deceleration control in response to required deceleration in collision-avoidance deceleration control being greater than required deceleration in following-travel control.

A third exemplary object of the present disclosure is to provide a vehicle control apparatus that causes an own vehicle to safely avoid a target object by steering.

A first exemplary embodiment of the present embodiment provides a vehicle control apparatus that is applicable to a vehicle including a monitoring sensor that monitors a front side of an own vehicle in a vehicle advancing direction and a brake apparatus that brakes the own vehicle. The vehicle control apparatus includes: a vehicle determining unit that determines whether a pre-preceding vehicle is present in front of a preceding vehicle in the vehicle advancing direction, the preceding vehicle being positioned in front of the own vehicle in the vehicle advancing direction; and a following control unit that, in response to the vehicle determining unit determining that the pre-preceding vehicle is present in front of the preceding vehicle in the vehicle advancing direction, compares a first required deceleration that is deceleration required to cause the own vehicle to travel so as to follow the preceding vehicle based on a monitoring result of the monitoring sensor monitoring the preceding vehicle and a second required deceleration that is deceleration required to cause the own vehicle to travel so as to follow the pre-preceding vehicle based on a monitoring result of the monitoring sensor monitoring the pre-preceding vehicle, and controls the brake apparatus to bring deceleration of the own vehicle closer to the second required deceleration in response to the second required deceleration being greater than the first required deceleration.

Therefore, when the required deceleration in following-travel control for the pre-preceding vehicle is determined to be greater than the required deceleration in following-travel control for the preceding vehicle, deceleration control of the own vehicle can be started in correspondence to the pre-preceding vehicle.

A second exemplary embodiment of the present disclosure provides a vehicle control apparatus that is applicable to a vehicle including a monitoring sensor that monitors a front side of an own vehicle in a vehicle advancing direction and a brake apparatus that brakes the own vehicle. The vehicle control apparatus includes: a deceleration determining unit that determines whether a second required deceleration that is deceleration required for the own vehicle to avoid collision with a preceding vehicle by deceleration based on a monitoring result of the monitoring sensor monitoring the preceding vehicle is greater than a first required deceleration that is deceleration required for the own vehicle to travel so as to follow the preceding vehicle based on the monitoring result of the monitoring sensor monitoring the preceding vehicle, the preceding vehicle traveling in front of the own vehicle in the vehicle advancing direction; and a deceleration control unit that controls the brake apparatus to bring the deceleration of the own vehicle closer to the second required deceleration in response to the deceleration determining unit determining that the second required deceleration is greater than the first required deceleration.

Therefore, when the required deceleration in collision-avoidance deceleration control is greater than the required deceleration in following-travel control, deceleration by collision-avoidance deceleration control can be started.

A third exemplary embodiment of the present disclosure provides a vehicle control apparatus that is applicable to a vehicle including a monitoring sensor that monitors a vicinity of an own vehicle and a steering apparatus that steers the own vehicle. The vehicle control apparatus includes: a following-travel control unit that causes the own vehicle to travel so as to follow a preceding vehicle traveling in front of the own vehicle in a vehicle advancing direction based on a result of the monitoring sensor monitoring the preceding vehicle; a first space determining unit that determines whether an avoidance space for the own vehicle to avoid, by steering, a target object positioned in front of the own vehicle in the vehicle advancing direction is present; a collision-avoidance determining unit that determines whether the own vehicle is unable to avoid collision with the target object by deceleration without steering avoidance; a second space determining unit that determines whether the avoidance space remains present in response to the own vehicle being decelerated for steering avoidance; a following-deceleration control unit that decelerates the own vehicle to cause the own vehicle to travel so as to follow the preceding vehicle in response to the second space determining unit determining that the avoidance space remains present; a steering control unit that causes the own vehicle to avoid the target object by steering by automatically controlling the steering apparatus; and a deceleration restricting unit that restricts deceleration of the own vehicle to travel so as to follow the preceding vehicle by the following-travel control unit to cause the own vehicle to avoid the target object by steering, compared to that by the following-deceleration control unit.

In the vehicle control apparatus, when the collision-avoidance determining unit determines that the own vehicle is unable to avoid collision with the target object by deceleration without steering avoidance, the first space determining unit determines that the avoidance space is present, and the second space determining unit determines that the avoidance space does not remain present when the own vehicle is decelerated for steering avoidance, the deceleration restricting unit restricts deceleration of the own vehicle by the following-travel control unit compared to that by the following-deceleration control unit, and the steering control unit causes the own vehicle to avoid the target object by steering by automatically controlling the steering apparatus.

Therefore, because the deceleration restricting unit restricts deceleration of the own vehicle by the following-travel control unit, compared to that by the following-deceleration control unit, the own vehicle can avoid the target object by steering while avoiding collision of a following vehicle with the own vehicle. Consequently, the own vehicle can safely avoid the target object by steering.

Here, reference numbers in parentheses attached to constituent elements and the like indicate an example of corresponding relationships between the constituent elements and the like, and specific constituent elements described according to embodiments described hereafter.

Embodiments of the present disclosure will hereinafter be described with reference to the drawings. Here, sections among the embodiments below that are identical or equivalent to each other are given the same reference numbers in the drawings to simplify the descriptions.

First Embodiment

A vehicle control apparatus 10 according to the present first embodiment is used in a vehicle control system 1 mounted in an automobile. The vehicle control system 1 performs autonomous driving of the automobile. First, the vehicle control system 1 will be described. In the present specification, the automobile in which the vehicle control system 1 is mounted is referred to as an own vehicle for convenience of description.

As shown in FIG. 1, the vehicle control system 1 includes the vehicle control apparatus 10, a brake apparatus 20, a steering apparatus 30, a traveling engine 40, a monitoring sensor 50, and a vehicle speed sensor 55. The vehicle control apparatus 10 is configured by a calculation processing unit 11, a memory 12, and the like.

Figure 4:
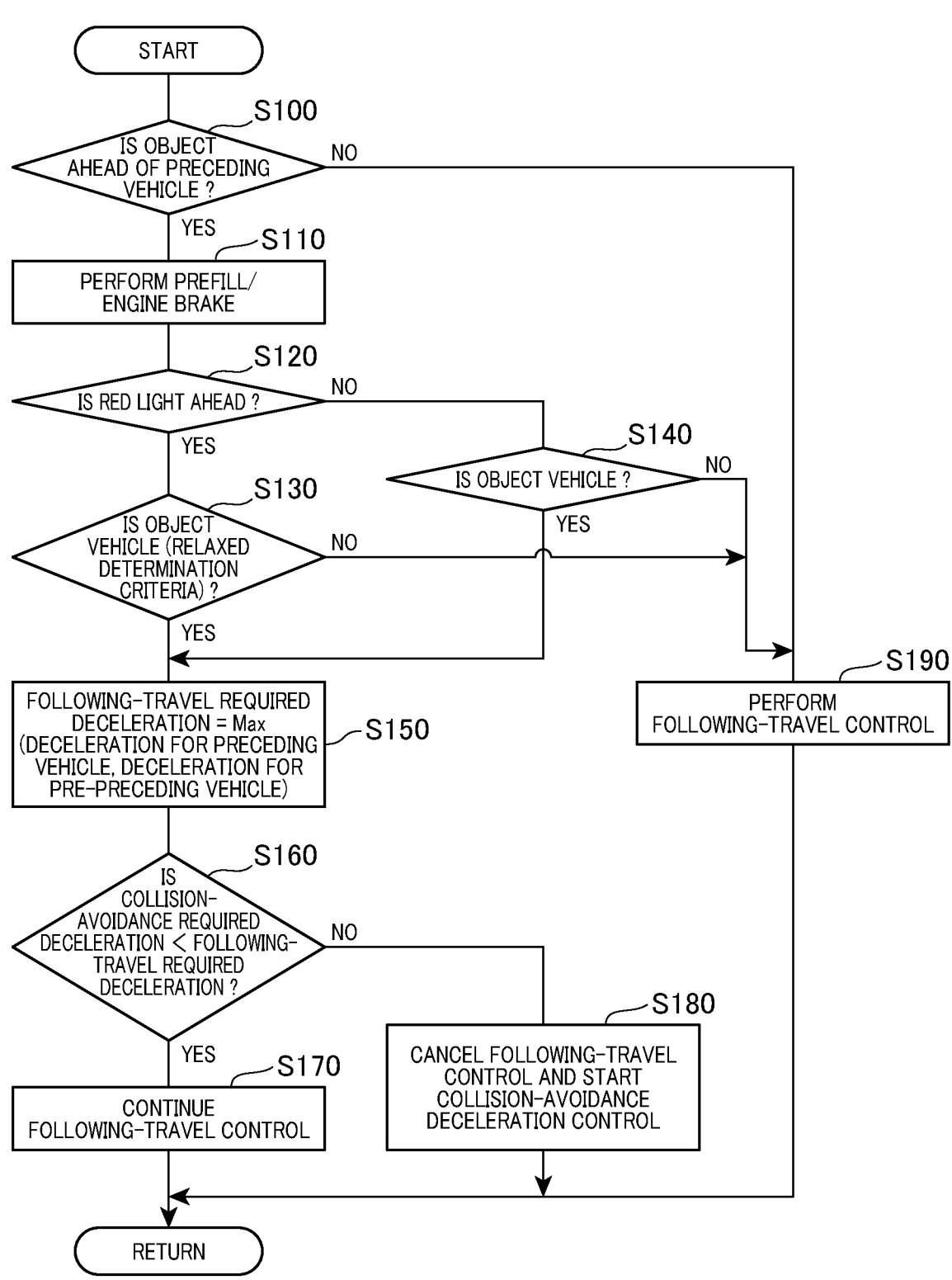
FIG. 4 is a flowchart of details of an autonomous driving control process performed by a calculation processing unit of the vehicle control apparatus in FIG. 1.

The calculation processing unit 11 is configured by a microcomputer or the like, and performs an autonomous driving control process based on a computer program in FIG. 4. The calculation processing unit 11 controls the brake apparatus 20, the steering apparatus 30, and the traveling engine 40 based on output signals of the monitoring sensor 50 and output signals of the vehicle speed sensor 55, in accompaniment with performing the autonomous driving control process. Here, details of the autonomous driving control process will be described hereafter.

The memory 12 is configured by a read-only memory (ROM), a random access memory (RAM), a flash memory, and the like. The flash memory is a writable, non-transitory, tangible storage medium in which a computer program run by the calculation processing unit 11, adaptive cruise control (ACC) map data, pre-crash system (PSC) map data, and the like are recorded.

The ACC map data is configured to have a plurality of intervehicle distances, a plurality of speeds of a target vehicle, a plurality of speeds of the own vehicle, and a plurality of required decelerations of the own vehicle so that the intervehicle distance, the speed of the target vehicle, a speed of the own vehicle, and the required deceleration of the own vehicle are identified in a 1:1:1:1 relationship.

The intervehicle distance is a distance between a target vehicle for following-travel control and the own vehicle. The required deceleration is deceleration required in the own vehicle to perform following-travel control. Deceleration is a value indicating a rate of change in speed per unit time when the speed of the vehicle decreases. Deceleration is expressed by a positive value. The deceleration increases as a braking force acting on the vehicle increases.

The PCS map data is configured to have a plurality of intervehicle distances, a plurality of speeds of the target vehicle, and a plurality of speeds and a plurality of required decelerations of the own vehicle so that the intervehicle distance, the speed of the target vehicle, and the speed and the required deceleration of the own vehicle are identified in a 1:1:1:1 relationship. The required deceleration is deceleration required in the own vehicle to perform collision-avoidance deceleration control.

Following-travel control is following-travel control to accelerate or decelerate the own vehicle to cause the own vehicle to travel so as to follow a target vehicle in front of the own vehicle in a vehicle advancing direction. Collision-avoidance deceleration control is control to decelerate the own vehicle and avoid a collision with a target vehicle in front of the own vehicle in the vehicle advancing direction.

The RAM is a writable, volatile storage medium used by the calculation processing unit 11 as a work area. The RAM is a non-transitory, tangible storage medium. The ROM is a non-writable, non-transitory, tangible storage medium in which a computer program run by the calculation processing unit 11 and the like are recorded.

The monitoring sensor 50 is a sensor that monitors the vicinity of the own vehicle. The monitoring sensor 50 is configured by an image sensor, a radar, an ultrasonic sensor, and the like.

The image sensor is a camera that images the vicinity of the own vehicle and outputs imaging data as a sensor signal. The radar is used to determine a distance between a target object and the own vehicle, and a relative speed between the target object and the own vehicle using light or radio waves, the target object being a vehicle or the like positioned in the vicinity of the own vehicle. In a manner similar to the radar, the ultrasonic sensor is used to determine the distance between the target object and the own vehicle, and the relative speed between the target object and the own vehicle using ultrasonic waves. The vehicle speed sensor 55 is a sensor that detects the speed of the own vehicle. The vehicle speed sensor 55 is configured by a rotation speed sensor that detects a rotation speed of a drive wheel of the own vehicle.

Figure 2:
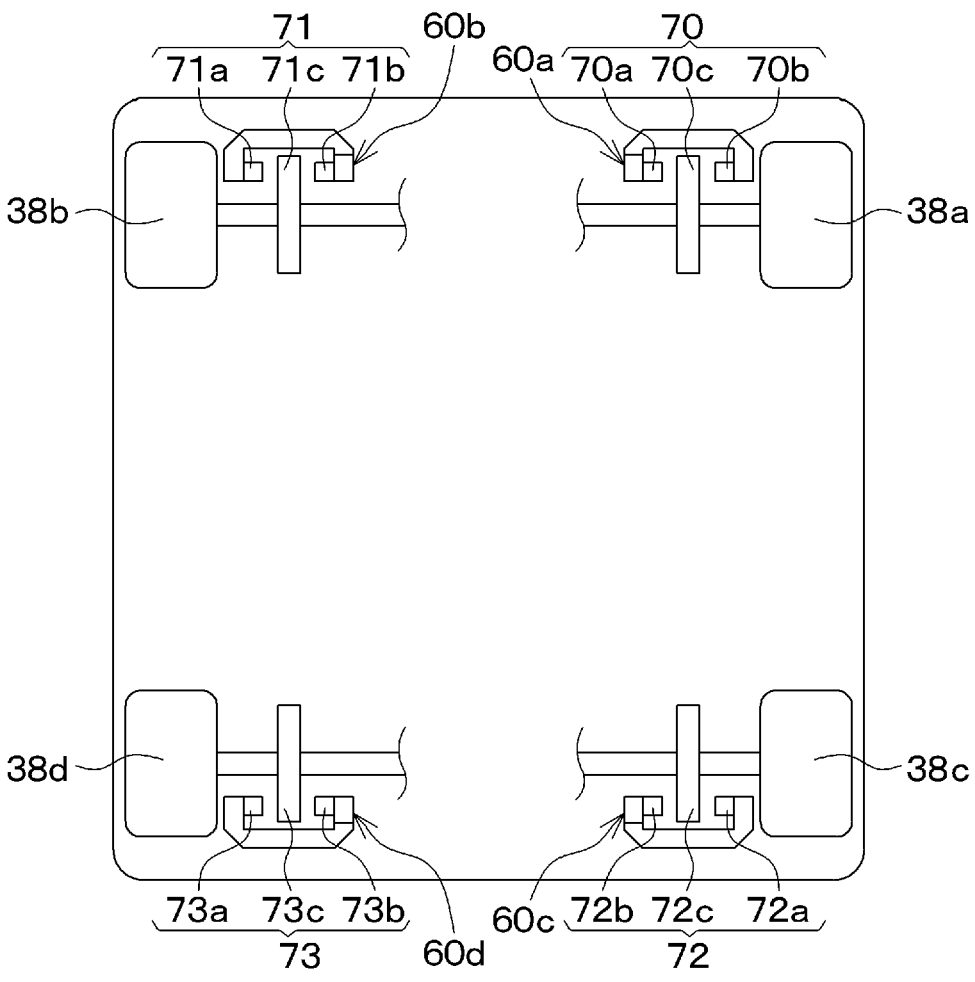
FIG. 2 is a schematic diagram of a general configuration of disc brakes of a brake apparatus in FIG. 1.

As shown in FIG. 1 and FIG. 2, the brake apparatus 20 includes pressure control units 21 and 22, and an electronic control apparatus 23. The brake apparatus 20 brakes a front right-side wheel 38a, a front left-side wheel 38b, a rear right-side wheel 38c, and a rear left-side wheel 38d. The pressure control unit 21 includes a reservoir 21a, an electric motor 21b, and a brake pump 21c.

The reservoir 21a stores brake fluid. The electric motor 21b is rotatably driven based on a drive signal from the electronic control apparatus 23 and transmits rotational force to the brake pump 21c. The brake pump 21c compresses the brake fluid stored in the reservoir 21a and ejects the brake fluid toward wheel cylinders 60, 61, 62, 63 by the rotational force outputted from the electrical motor 21b.

The pressure control unit 22 configures a control valve that controls the pressure of the brake fluid provided from the brake pump 21c to pistons 60a, 60b, 60c, and 60d, through the wheel cylinders 60, 61, 62, and 63.

The piston 60a in FIG. 2 drives brake pads 70a and 70b by the pressure of the brake fluid provided from the pressure control unit 22. The brake pads 70a and 70b configure a disc brake 70 that presses against a brake disc 70c and brakes the front right-side wheel 38a.

The piston 60b drives brake pads 71a and 71b by the pressure of the brake fluid provided from the pressure control unit 22. The brake pads 71a and 71b configure a disc brake 71 that presses against a brake disc 71c and brakes the front left-side wheel 38b.

The piston 60c drives brake pads 72a and 72b by the pressure of the brake fluid provided from the pressure control unit 22. The brake pads 72a and 72b configure a disc brake 72 that presses against a brake disc 72c and brakes the rear right-side wheel 38c.

The piston 60d drives brake pads 73a and 73b by the pressure of the brake fluid provided from the pressure control unit 22. The brake pads 73a and 73b configure a disc brake 73 that presses against a brake disc 73c and brakes the rear left-side wheel 38d.

The electronic control apparatus 23 is configured by a microcomputer, a memory, and the like, and controls the electric motor 21b and the pressure control unit 22 based on control signals from the calculation processing unit 11. The memory is a non-transitory, tangible storage medium.

The steering apparatus 30 adjusts a steering angle of the front wheels 38a and 38b that are steering wheels of an own vehicle 100. The steering angle refers to a steering angle formed between a straight-advancing direction that is a direction when the front wheels 38a and 38b advance straight ahead, and an actual advancing direction of the front wheels 38a and 38b. The front wheels 38a and 38b refer to the front right-side wheel 38a and the front left-side wheel 38b, collectively.

The traveling engine 40 is a traveling drive source, and is an internal combustion engine that outputs rotational force to the front right-side wheel 38a and the front left-side wheel 38b that are drive wheels by combustion of fuel, such as gasoline or gas oil.

Here, the traveling drive source is not limited to being configured by the traveling engine 40, and may be configured by the traveling engine 40 and a traveling electric motor. Alternatively, the traveling drive source may be configured by only the traveling electric motor, of the traveling engine 40 and the traveling electric motor.

Figure 3:
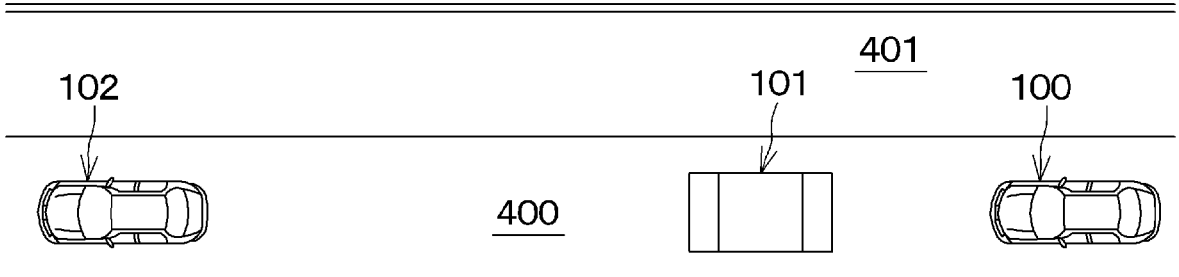
FIG. 3 is a diagram of a specific example in which a preceding vehicle is traveling in front of an own vehicle in a vehicle advancing direction and a pre-preceding vehicle is stationary in front of the preceding vehicle in the vehicle advancing direction, according to the first embodiment.

Next, an autonomous driving control process by the calculation processing unit 11 according to the present embodiment will be described with reference to FIG. 3 to FIG. 10. Here, for convenience of description, as shown in FIG. 3, a vehicle traveling in front of the own vehicle 100 in the vehicle advancing direction is a preceding vehicle 101 and a vehicle that is stationary in front of the preceding vehicle 101 in the vehicle advancing direction is a preceding vehicle 102.

The calculation processing unit 11 performs the autonomous driving control process based on a flowchart in FIG. 4.

First, at step S100, the calculation processing unit 11 as an object determining unit determines whether an object is present on a road in front of the preceding vehicle in the vehicle advancing direction based on an output signal of the monitoring sensor 50.

Figure 5:
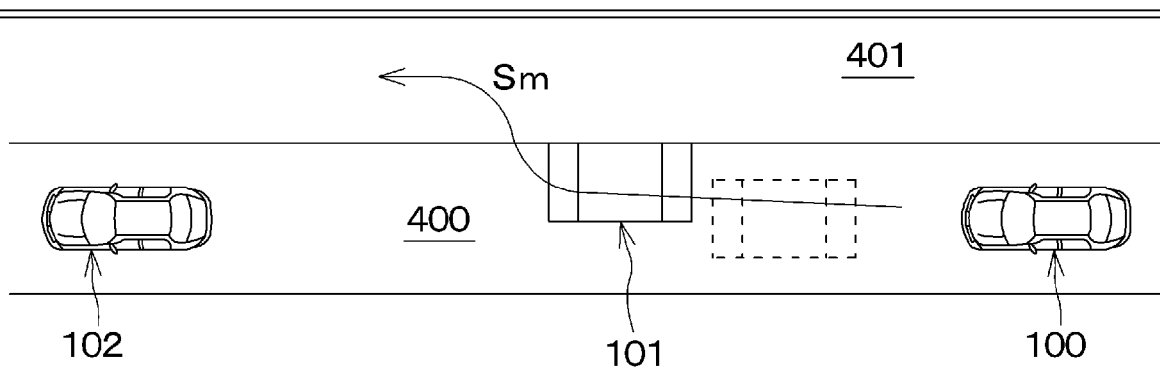
FIG. 5 is a diagram of a state in which the preceding vehicle is in the midst of avoiding the pre-preceding vehicle by steering according to the first embodiment.
Figure 6:
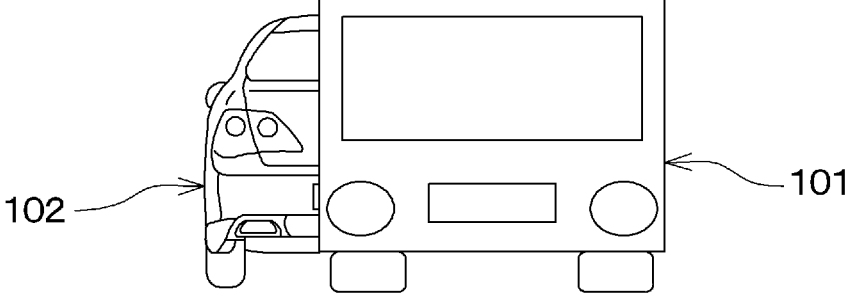
FIG. 6 is a view from the own vehicle side of a rear portion of the preceding vehicle and a rear portion of the pre-preceding vehicle while the preceding vehicle is in the midst of avoiding the pre-preceding vehicle by steering according to the first embodiment, and is a diagram of a specific example in which a portion of the rear portion of the pre-preceding vehicle is exposed toward the own vehicle side.

At this time, as indicated by an arrow Sm in FIG. 5, while the preceding vehicle 101 is in the midst of avoiding the pre-preceding vehicle 102 by steering, as shown in FIG. 6, a portion of a rear portion of the pre-preceding vehicle 102 is exposed toward the own vehicle 100 side. In accompaniment, the portion of the rear portion of the pre-preceding vehicle 102 is monitored by the monitoring sensor 50.

Therefore, at step S100, the calculation processing unit 11 determines that an object is present on the road in front of the preceding vehicle 101 in the vehicle advancing direction based on a monitoring result of the monitoring sensor 50 monitoring the portion of the rear portion of the pre-preceding vehicle 102, and makes an YES determination.

At this time, when the object is actually the pre-preceding vehicle 102 that is stationary, the own vehicle 100 is required to be decelerated to avoid collision of the own vehicle 100 with the preceding vehicle 101 and the pre-preceding vehicle 102.

Therefore, at S110, the calculation processing unit 11 outputs, to the electronic control apparatus 23, a prefill control signal that causes the brake apparatus 20 to perform prefill control. The calculation processing unit 11 also outputs a brake control signal to cause the traveling engine 40 to generate engine braking. Here, step S110 configures a prefill control unit and an engine control unit.

The electronic control apparatus 23 controls the brake pump 21c through the electric motor 21b based on the prefill control signal from the calculation processing unit 11. As a result, the brake pump 21c compresses the brake fluid in the reservoir 21a and ejects the brake fluid to the pressure control unit 2, and the wheel cylinders 60, 61, 62, and 63.

As a result, the pressure of the brake fluid in the wheel cylinders 60, 61, 62, and 63 increases in advance. At this time, the brake pads 70a, 70b, 71a, 72b, 73a, and 73b are respectively in a non-contact state with the brake discs 70c, 71c, 72c, and 73c.

The traveling engine 40 generates engine braking based on the brake control signal from the calculation processing unit 11. As a result, the wheels 38a, 38b, 38c, and 38d are braked and decelerated.

Next, at step S120, the calculation processing unit 11 as a red light determining unit determines whether a traffic light 80 displaying a red light toward the own vehicle 100 is present in front of the own vehicle 100 in the vehicle advancing direction based on the output signal of the monitoring sensor 50.

At this time, at step S120, the calculation processing unit 11 makes a NO determination when the traffic light 80 displaying the red light is not present in front of the own vehicle in the vehicle advancing direction.

In accompaniment thereto, at step S140, the calculation processing unit 11 determines whether the object is a vehicle (that is, the pre-preceding vehicle 102) based on the output signal of the monitoring sensor 50.

Specifically, at step S140, the calculation process unit 11 as a vehicle determining unit determines whether the object is a vehicle based on, for example, pattern recognition using image data of an overall rear portion of a vehicle and artificial intelligence.

Figure 7:
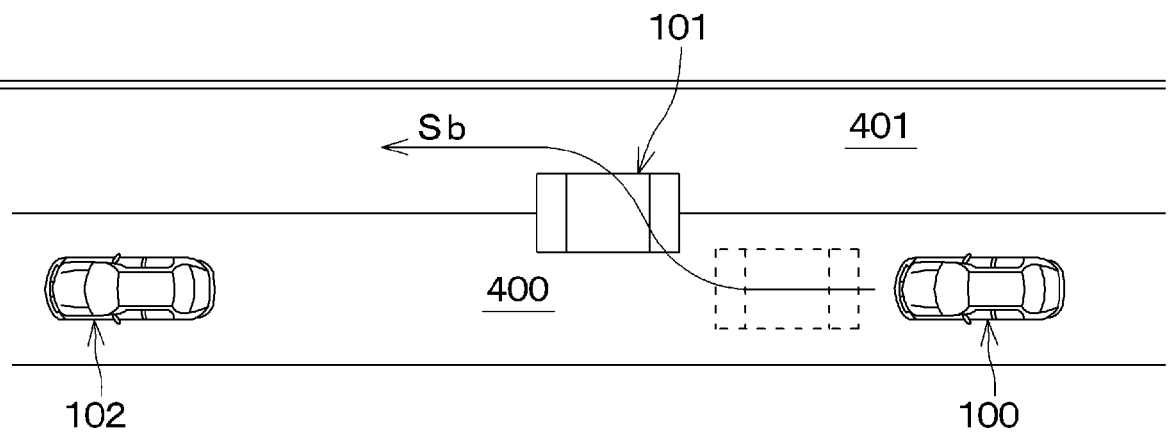
FIG. 7 is a diagram of a state in which the preceding vehicle is in the midst of avoiding the pre-preceding vehicle by steering according to the first embodiment.
Figure 8:
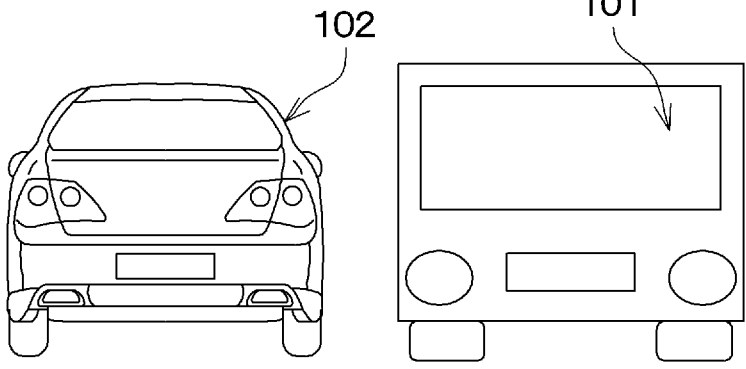
FIG. 8 is a view from the own vehicle side of the rear portion of the preceding vehicle and the rear portion of the pre-preceding vehicle while the preceding vehicle is in the midst of avoiding the pre-preceding vehicle by steering according to the first embodiment, and is used to supplement description of a determination of whether an object is a vehicle in the autonomous driving control process in FIG. 4.

At this time, when the object is the pre-preceding vehicle 102, while the preceding vehicle 101 is in the midst of avoiding the pre-preceding vehicle 102 by steering as indicated by an arrow Sb in FIG. 7, the overall rear portion of the pre-preceding vehicle 102 is exposed toward the own vehicle 100 side as shown in FIG. 8.

In accompaniment thereto, the overall rear portion of the pre-preceding vehicle 102 is monitored by the monitoring sensor 50. Therefore, at step S140, the calculation processing unit 11 determines that the object is a vehicle based on a monitoring result of the monitoring sensor 50 monitoring the pre-preceding vehicle 102, and makes an YES determination.

Figure 9:
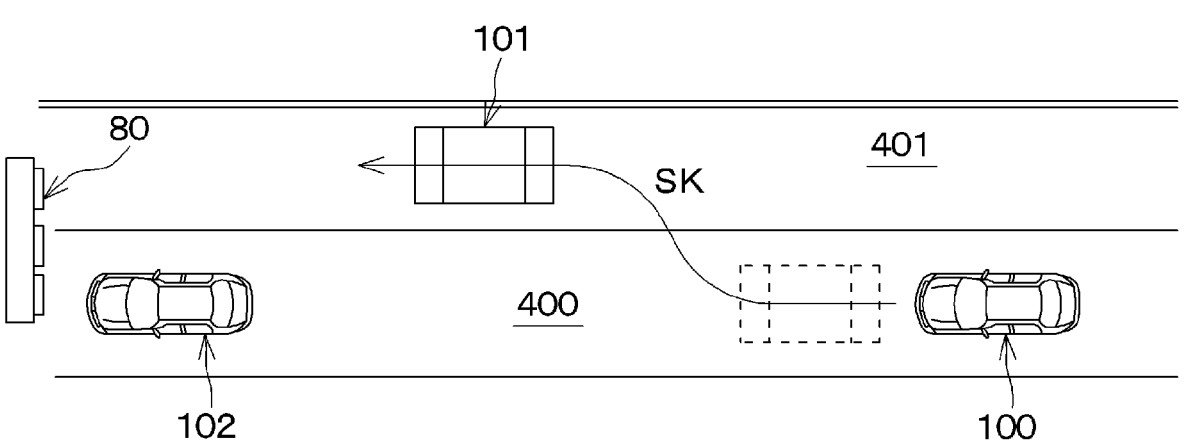
FIG. 9 is a diagram of a specific example in which a traffic light displaying a red light is present in front of the own vehicle according to the first embodiment, and is used to supplement description of a determination of whether a traffic light displaying a red light is present in front of the own vehicle in the vehicle advancing direction.

In addition, as shown in FIG. 9, when the traffic light 80 displaying the red light toward the own vehicle 100 is present in front of the own vehicle in the vehicle advancing direction, the calculation processing unit 11 makes an YES determination at above-described step S120.

In this case, when the own vehicle 100 subsequently travels toward the traffic light 80, the own vehicle 100 is required to stop in adherence to the red light of the traffic light 80. Therefore, according to the present embodiment, in advanced preparation for the red light of the traffic light 80, at subsequent step S130, vehicle determination of the object is performed with a more relaxed determination criteria and in a shorter amount of time than at above-described step S140

Specifically, at step S130, the calculation processing unit 11 determines whether the object is a vehicle based on determination criteria that is more relaxed than those at above-described step S140. For example, the calculation processing unit 11 as the vehicle determining unit determines whether the object is a vehicle based on pattern recognition using image data showing half of the rear portion of the pre-preceding vehicle 102, artificial intelligence, and the like.

Figure 10:
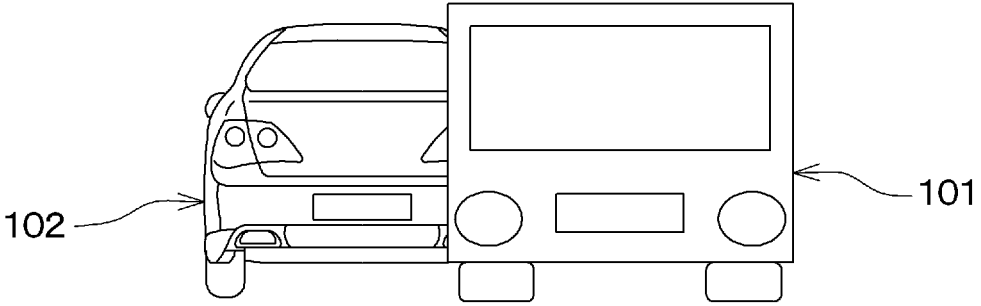
FIG. 10 is a view from the own vehicle side of the rear portion of the preceding vehicle and the rear portion of the pre-preceding vehicle while the preceding vehicle is in the midst of avoiding the pre-preceding vehicle by steering according to the first embodiment, and a diagram of a specific example in which half or more of the rear portion of the pre-preceding vehicle is exposed toward the own vehicle side.

At this time, as shown in FIG. 10, when half of the rear portion of the pre-preceding vehicle 102 is exposed toward the own vehicle 100 side, half of the rear portion of the pre-preceding vehicle 102 is monitored by the monitoring sensor 50.

Therefore, at step S130, the calculation processing unit 11 determines that the object is a vehicle (that is, the pre-preceding vehicle) and makes an YES determination.

In this manner, the calculation processing unit 11 makes an YES determination at either of steps S140 and S130.

Here, to avoid collision of the own vehicle with the pre-preceding vehicle or the preceding vehicle, deceleration of the own vehicle is required to be brought closer to a greater required deceleration Gx between required deceleration Ga1 in following-travel control for the preceding vehicle and required deceleration Ga2 in following-travel control for the pre-preceding vehicle.

Therefore, at step S150, the calculation processing unit 11 performs deceleration control in following-travel control by the brake apparatus 20 based on the output signal of the monitoring sensor 50 and the output signal of the vehicle speed sensor 55. Here, step S150 configures a first deceleration calculating unit, a second deceleration calculating unit, a deceleration determining unit, and a following control unit.

Specifically, the calculation processing unit 11 determines the required decelerations Ga1 and Ga2 in following (a) and (b).

(a) The calculation processing unit 11 determines the speed of the preceding vehicle, the speed of the own vehicle, and the intervehicle distance of the preceding vehicle and the own vehicle, and determines the required deceleration Ga1 identified by the speed of the preceding vehicle, the speed of the own vehicle, and the intervehicle distance through the ACC map data. The required deceleration Ga1 corresponds to a first required deceleration.

(b) The calculation processing unit 11 determines the speed of the pre-preceding vehicle, the speed of the own vehicle, and the intervehicle distance of the pre-preceding vehicle and the own vehicle, and determines the required deceleration Ga2 identified by the speed of the pre-preceding vehicle, the speed of the own vehicle, and the intervehicle distance through the ACC map data. The required deceleration Ga2 corresponds to a second required deceleration.

At this time, the calculation processing unit 11 selects the required deceleration Gx that is the greater of the required decelerations Ga1 and Ga2, and outputs, to the electronic control apparatus 23, the control signal for bringing the deceleration of the own vehicle closer to the selected required deceleration Gx.

At this time, the electronic control apparatus 23 controls the brake pump 21c through the electric motor 21b based on the control signal from the calculation processing unit 11. Then, the brake pump 21c compresses the brake fluid in the reservoir 21a and ejects the brake fluid to the pistons 60a, 61a, 62a, and 63a through the pressure control unit 22 and the wheel cylinders 60, 61, 62, and 63.

Therefore, the pressure of the brake fluid in the wheel cylinders 60, 61, 62, and 63 further increases. As a result, the pistons 60a, 61a, 62a, and 63a respectively drive the disc brakes 70, 71, 72, and 73 by the pressure of the brake fluid in the wheel cylinders 60, 61, 62, and 63, and brake the wheels 38a, 38b, 38c, and 38d. Consequently, the deceleration of the own vehicle 100 becomes closer to the required deceleration Gx.

Therefore, when the required deceleration Ga1 is greater than the required deceleration Ga2, the own vehicle decelerates to travel so as to follow the preceding vehicle. When the required deceleration Ga2 is greater than the required deceleration Ga1, the own vehicle decelerates to travel so as to follow the pre-preceding vehicle.

Here, the disc brakes 70, 71, 72, and 73 correspond to a plurality of brakes. The wheels 38a, 38b, 38c, and 38d correspond to a plurality of wheels.

Here, when a timing at which the preceding vehicle starts steering avoidance of the pre-preceding vehicle is late, or when the relative speed between the own vehicle and the pre-preceding vehicle is large, transition from following-travel control to collision-avoidance deceleration control is required to avoid collision of the own vehicle with the pre-preceding vehicle.

Therefore, at step S160, the calculation processing unit 11 determines whether the required deceleration in following-travel control is greater than the required deceleration in collision-avoidance deceleration control based on the output signal of the monitoring sensor and the output signal of the vehicle speed sensor 55.

Specifically, the calculation processing unit 11 determines the required deceleration in following-travel control (that is, the first required deceleration) in a manner similar to above-described (a). The required deceleration is deceleration required in following-travel control in which the pre-preceding vehicle is the target vehicle.

The calculation processing unit 11 determines the speed of the pre-preceding vehicle, the speed of the own vehicle, and the intervehicle distance between the pre-preceding vehicle and the own vehicle, and determines the required deceleration (that is, the second required deceleration) iden-tified by the speed of the pre-preceding vehicle, the speed of the own vehicle, and the intervehicle distance through the PCS map data.

At step S160, the calculation processing unit 11 makes an YES determination when the required deceleration in following-travel control is greater than the required deceleration in collision-avoidance deceleration control.

Next, at step S170, the calculation processing unit 11 outputs, to the electronic control apparatus 23, a control signal to bring the deceleration of the own vehicle closer to the required deceleration in following-travel control to continue following-travel control in which the pre-preceding vehicle is the target vehicle.

Therefore, the electronic control apparatus 23 operates the brake pump 21c, the pistons 60a, 60b, 60c, and 60d, and the disc brakes 70, 71, 72, and 73 in a manner similar to that described above, and brakes the wheels 38a, 38b, 38c, and 38d. As a result, the deceleration of the own vehicle becomes closer to the required deceleration in following-travel control.

Here, step S160 configures the first deceleration calculating unit, the second deceleration calculating unit, and the deceleration determining unit. Step S170 configures the deceleration control unit.

In addition, at step S160, the calculation processing unit 11 makes a NO determination when the required deceleration in collision-avoidance deceleration control is greater than the required deceleration in following-travel control.

In accompaniment, at step S180, the calculation processing unit 11 cancels following-travel control and outputs, to the electronic control apparatus 23, a control signal to bring the deceleration of the own vehicle closer to the required deceleration in collision-avoidance deceleration control.

Therefore, the electronic control apparatus 23, the brake pump 21c, the pistons 60a, 60c, and 60d, and the disc brakes 70, 71, 72, and 73 operate in a manner similar to that described above and brake the wheels 38a, 38b, 38c, and 38d. As a result, the deceleration of the own vehicle becomes closer to the required deceleration in collision-avoidance deceleration control.

In addition, at step S100, the calculation processing unit 11 makes a NO determination when an object is not present ahead of the preceding vehicle in the vehicle advancing direction.

Furthermore, at either of steps S130 and S140, the calculation processing unit 11 makes a NO determination when the object is a road structure other than a vehicle.

Moreover, as shown in FIG. 6, even when the object is actually the pre-preceding vehicle 102, if half or more of the rear portion of the pre-preceding vehicle 102 is covered by the preceding vehicle 101, the calculation processing unit 11 cannot determine whether the object is a vehicle. Therefore, the calculation processing unit 11 determines that the object is not a vehicle and makes a NO determination at both steps S130 and S140.

As shown in FIG. 10, even when an area of the rear portion of the pre-preceding vehicle 102 that is covered by the preceding vehicle 101 is half or less, the calculation processing unit 11 determines whether the object is a vehicle based on strict determination criteria at step S140. Therefore, at step S140, the calculation processing unit 11 determines that the object is not a vehicle and makes a NO determination.

In this manner, when the NO determination is made at any one of steps S100, S130, and S140, the calculation processing unit 11 proceeds to subsequent step S190. The calculation processing unit 11 controls the traveling engine 40 and the brake apparatus 20, and accelerates or decelerates the own vehicle to travel so as to follow the preceding vehicle 101.

According to the present embodiment described above, the calculation processing unit 11 of the vehicle control apparatus 10 determines the required deceleration Ga1 required to travel so as to follow the preceding vehicle based on the monitoring result of the monitoring sensor 50 monitoring the preceding vehicle.

The calculation processing unit 11 determines the required deceleration Ga2 required to cause the own vehicle to travel so as to follow the pre-preceding vehicle based on the monitoring result of the monitoring sensor 50 monitoring the pre-preceding vehicle that is stationary in front of the preceding vehicle in the vehicle advancing direction.

When determined that the required deceleration Ga2 is greater than the required deceleration Ga1, the calculation processing unit 11 controls the brake apparatus 20 to bring the deceleration of the own vehicle closer to the required deceleration Ga2 and performs following-travel control in which the pre-preceding vehicle is the target vehicle.

Therefore, when the preceding vehicle avoids, by steering, the pre-preceding vehicle that is stationary in front of the preceding vehicle in the vehicle advancing direction, deceleration control of the own vehicle can be started immediately after the monitoring sensor 50 starts monitoring the pre-preceding vehicle. As a result, the own vehicle can be prevented from colliding with the pre-preceding vehicle.

According to the present embodiment, the calculation processing unit 11 controls the brake apparatus 20 to bring the deceleration of the own vehicle 100 closer to the required deceleration in collision-avoidance deceleration control when the required deceleration in collision-avoidance deceleration control is determined to be greater than the required deceleration in following-travel control.

Therefore, when the timing at which the preceding vehicle avoids the pre-preceding vehicle by steering is late and the intervehicle distance between the own vehicle and the pre-preceding vehicle is short, or when the relative speed between the own vehicle and the pre-preceding vehicle is large, the own vehicle can be prevented from colliding with the pre-preceding vehicle.

In addition, in general, a greater required deceleration is calculated in collision-avoidance deceleration control than following-travel control in a scene in which the own vehicle is approaching the pre-preceding vehicle.

Therefore, in a scene in which the preceding vehicle avoids the pre-preceding vehicle by steering, a timing in which the own vehicle is not approaching the pre-preceding vehicle and the "required deceleration in following-travel control" is greater than the "required deceleration in collision-avoidance deceleration control" may occur.

However, if an execution condition for deceleration control through collision-avoidance deceleration control is met and deceleration control by following-travel control is canceled as in the vehicle control apparatus in JP 2018-165085 A, described above, braking force of the own vehicle temporarily decreases.

In contrast, according to the present embodiment, as described above, when the required deceleration in collision-avoidance deceleration control is determined to be greater than the required deceleration in following-travel control, the brake apparatus 20 is controlled to bring the deceleration of the own vehicle closer to the required deceleration in collision-avoidance deceleration control. Therefore, the braking force of the own vehicle does not temporarily decrease.

According to the present embodiment described above, following effects (1), (2), and (3) are achieved.

(1) The calculation processing unit 11 performs prefill control from when an object is determined to be present on the road in front of the preceding vehicle in the vehicle advancing direction until the object is determined to be a vehicle. Therefore, when the calculation processing unit 11 controls the brake apparatus 20 after performing prefill control, the deceleration of the own vehicle 100 can be brought closer to the required deceleration Gin a short amount of time.

(2) The calculation processing unit 11 generates engine braking by the traveling engine 40 from when an object is determined to be present on the road in front of the preceding vehicle in the vehicle advancing direction until the object is determined to be a vehicle. Therefore, the own vehicle can be decelerated in advance without use of the brake apparatus 20 to avoid collision of the own vehicle with the preceding vehicle and the pre-preceding vehicle.

(3) At step S130, the calculation processing unit 11 determines whether the object is a vehicle based on a more relaxed determination criteria than at step S140. Therefore, at step S130, the calculation processing unit 11 can determine whether the object is a vehicle in a shorter amount of time than at step S140.

Consequently, when the traffic light 80 that is a red light is present in front of the own vehicle in the vehicle advancing direction, deceleration by following-travel control can be performed at an early timing while suppressing erroneous deceleration by the brake apparatus 20.

Second Embodiment

According to the above-described first embodiment, an example in which the own vehicle performs deceleration control through following-travel control for the preceding vehicle or the pre-preceding vehicle to avoid collision is described. However, instead, according to the present second embodiment, an example in which the own vehicle avoids the preceding vehicle by steering to avoid collision is described.

Hardware configurations of the vehicle control apparatus 10 of the own vehicle 100 are shared between the present embodiment and the above-described first embodiment, and an autonomous driving control process performed by the calculation processing unit 11 differs therebetween.

Figure 11:
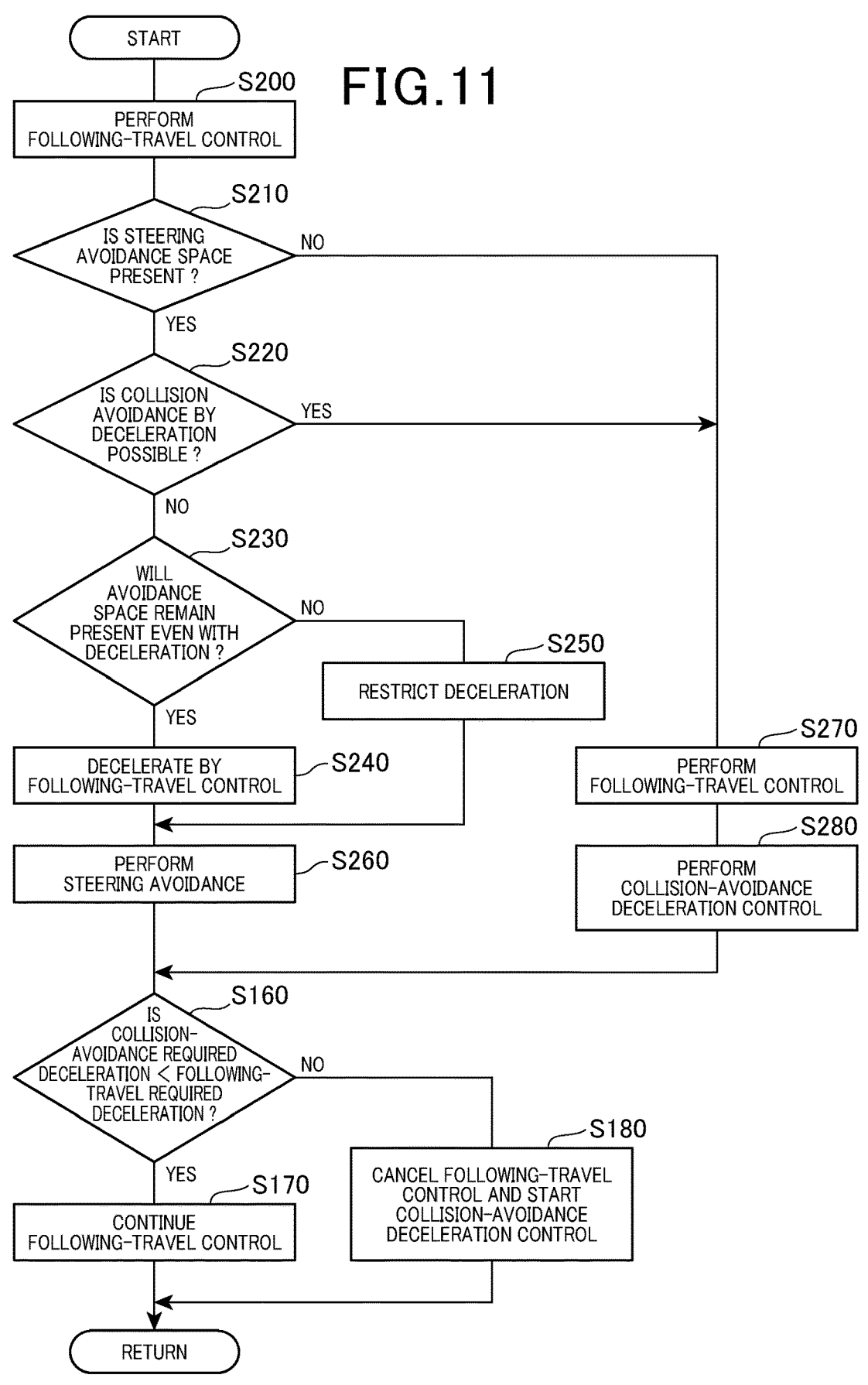
FIG. 11 is a flowchart of details of an autonomous driving control process performed by a calculation processing unit according to a second embodiment.

Therefore, the autonomous driving control process performed by the calculation processing unit 11 will mainly be described below with reference to FIG. 11 and FIG. 12. FIG. 11 is a flowchart of details of the autonomous driving control process according to the present embodiment. In FIG. 11, reference numbers that are the same as those in FIG. 4 indicate identical steps. Descriptions thereof are simplified. The calculation processing unit 11 performs the autonomous driving control process based on the flowchart in FIG. 11.

First, at step S200, the calculation processing unit 11 as a following-travel control unit controls the traveling engine 40 and the brake apparatus 20 based on the output signal of the monitoring sensor 50, and causes the own vehicle to travel so as to follow the preceding vehicle traveling in front of the own vehicle in the vehicle advancing direction.

Next, at step S210, the calculation processing unit 11 determines whether avoidance space for the own vehicle to avoid, by steering, a pre-preceding vehicle (that is, a target object) that is stationary in front of the preceding vehicle in the vehicle advancing direction is present, based on peripheral information acquired by the monitoring sensor 50. Step S210 corresponds to a first space determining unit.

Specifically, the calculation processing unit 11 determines whether the avoidance space is present based on presence/absence of a traveling trajectory by which the preceding vehicle changes traveling lanes and avoids the pre-preceding vehicle by steering.

Figure 12:
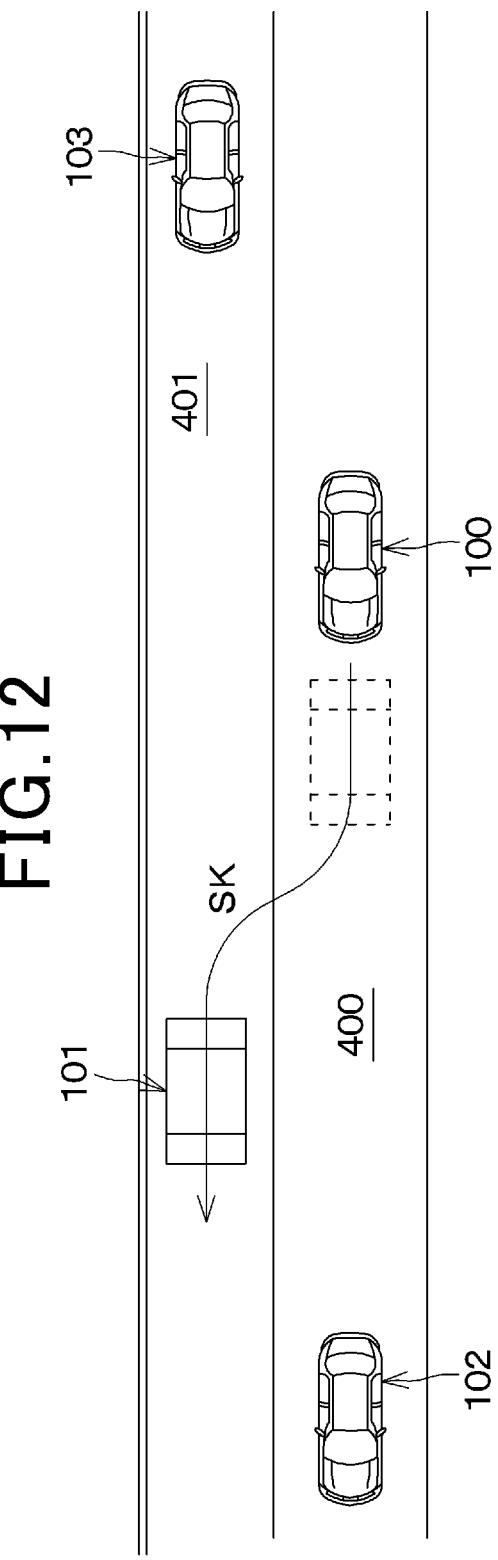
FIG. 12 is a diagram used to supplement description of a determination of whether an avoidance space for steering avoidance of a pre-preceding vehicle remains present even when an own vehicle is decelerated in the autonomous driving control process in FIG. 11, according to the second embodiment.

Here, as indicated by an arrow SK in FIG. 12, when the traveling trajectory by which the traveling lane of the preceding vehicle 101 is changed from a lane 400 to a passing lane 401 and the pre-preceding vehicle 102 is avoided by steering is present, the calculation processing unit 11 makes an YES determination at step S210.

Next, at step S220, the calculation processing unit 11 as a collision-avoidance determining unit determines whether the own vehicle can be prevented from colliding with the pre-preceding vehicle even if the own vehicle is decelerated without steering avoidance by following-travel control and collision-avoidance deceleration control in coordination.

Specifically, in a manner similar to step S160 according to the above-described first embodiment, the calculation processing unit 11 determines the required deceleration required in collision-avoidance deceleration control with the pre-preceding vehicle as the target vehicle, and determines whether the required deceleration is equal to or greater than a predetermined value.

At step S220, when the required deceleration is equal to or greater than the predetermined value, the calculation processing unit 11 determines that collision of the own vehicle with the pre-preceding vehicle is unavoidable even if the own vehicle is decelerated without steering avoidance by following-travel control and collision-avoidance deceleration control in coordination, and makes a NO determination.

Next, at step S230, the calculation processing unit 11 determines whether the avoidance space for avoiding the pre-preceding vehicle by steering remains present even if the own vehicle is decelerated for steering avoidance, based on the peripheral information of the own vehicle acquired by the monitoring sensor 50. Step S230 corresponds to a second space determining unit.

At this time, at step S230, when other vehicles are not present in the vehicle advancing direction of the own vehicle and to the sides of the own vehicle, the calculation processing unit 11 determines that the avoidance space remains present even if the own vehicle is decelerated for steering avoidance, and makes an YES determination.

Next, at step S240, the calculation processing unit 11 determines the required deceleration in following-travel control in which the preceding vehicle is the target vehicle as described above, based on the output signal of the monitoring sensor 50, and controls the brake apparatus 20 to bring the deceleration of the own vehicle closer to the required deceleration. As a result, the own vehicle is decelerated to travel so as to follow the preceding vehicle to avoid the pre-preceding vehicle by steering. Step S240 corresponds to a following-deceleration control unit.

Next, at step S260, the calculation processing unit 11 automatically controls the steering apparatus 30 to cause the own vehicle to travel along the traveling trajectory determined at above-described step S210, and thereby causes the own vehicle to avoid the pre-preceding vehicle by steering. Subsequently, in a manner similar to that according to the above-described first embodiment, the calculation processing unit 11 performs processes at step S160 and subsequent steps.

In addition, as shown in FIG. 12, a following vehicle 103 may appear behind the own vehicle 100 in the vehicle advancing direction in the passing lane 401 adjacent to the traffic lane 400 in which the own vehicle 100 is traveling. In this case, at step S230, the calculation processing unit 11 determines that the avoidance space does not remain present when the own vehicle is decelerated to avoid the pre-preceding vehicle by steering, and makes a NO determination.

Next, at step S250, the calculation processing unit 11 restricts the deceleration of the own vehicle by following-travel control to cause the own vehicle to avoid the pre-preceding vehicle by steering, compared to the deceleration control process at above-described step S240.

Next, at step S260, the calculation processing unit 11 automatically controls the steering apparatus 30 to cause the own vehicle to travel along the above-described traveling trajectory, and causes the own vehicle to avoid the pre-preceding vehicle by steering.

Subsequently, the calculation processing unit 11 performs processes at step S160 and subsequent steps. Here, step S250 is a deceleration restricting unit and step S260 is a steering control unit.

In addition, at step S210, the calculation processing unit 11 determines that the avoidance space is not present when the traveling trajectory by which the preceding vehicle changes traveling lanes and avoids the pre-preceding vehicle by steering is not determined, and makes a NO determination.

Furthermore, at step S220, the calculation processing unit 11 makes an YES determination when the required deceleration in collision-avoidance deceleration control is less than the predetermined value. As a result, the calculation processing unit 11 determines that the own vehicle can be prevented from colliding with the pre-preceding vehicle if the own vehicle is decelerated by following-travel control and collision-avoidance deceleration control in coordination.

When the NO determination is made at either of steps S220 and S210, at steps S270 and S280, the calculation processing unit 11 performs following-travel control and collision-avoidance deceleration control in coordination. As a result, the own vehicle drives the brake apparatus 20 and decelerates.

According to the present embodiment described, when following conditions (e), (f), and (g) are met, the calculation processing unit 11 restricts the deceleration of the own vehicle by following-travel control at step S250, compared to the deceleration control process at step S240. In addition, the calculation processing unit 11 causes the own vehicle to avoid the pre-preceding vehicle by steering by automatically controlling the steering apparatus 30.

(e) The calculation processing unit 11 determines that the avoidance space for the own vehicle to avoid the pre-preceding vehicle by steering is present. (f) The calculation processing unit 11 determines that the own vehicle is unable to avoid collision with the pre-preceding vehicle by deceleration without steering avoidance. (g) When the own vehicle is decelerated to avoid the pre-preceding vehicle by steering, the calculation processing unit 11 determines that the avoidance space for the own vehicle to avoid the pre-preceding vehicle by steering does not remain present.

As a result of the above, even when the avoidance space for the own vehicle does not remain present when the own vehicle is decelerated for steering avoidance, the own vehicle can avoid the target object by steering while avoiding collision of a following vehicle with the own vehicle. Consequently, the own vehicle can safely avoid the target object by steering.

According to the present embodiment described above, the following effect (4) can be achieved. (4) The calculation processing unit 11 determines whether the avoidance space is present based on presence/absence of the traveling trajectory by which the traveling lane of the preceding vehicle is changed and the pre-preceding vehicle is avoided by steering, based on the monitoring result of the monitoring sensor 50 monitoring the preceding vehicle. As a result, whether the avoidance space is present can be determined with high accuracy.

Third Embodiment

According to the above-described first embodiment, an example in which the calculation processing unit 11 performs prefill control and engine braking when an object is determined to be present in front of the preceding vehicle in the vehicle advancing direction is described.

However, instead, according to the present third embodiment, an example in which prefill control and engine braking are prohibited from being performed when the speed of the own vehicle is less than a threshold will be described with reference to FIG. 13.

Figure 13:
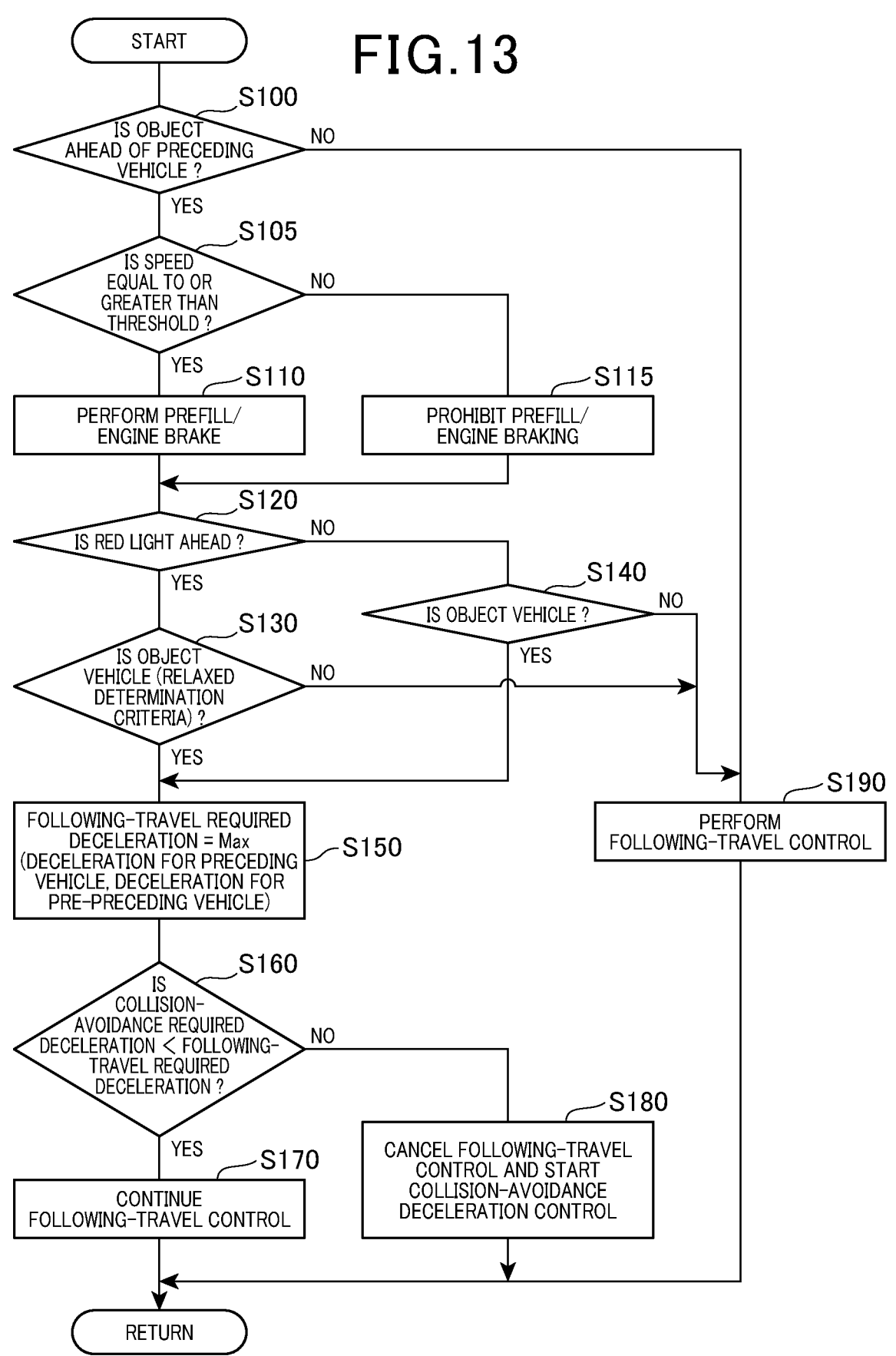
FIG. 13 is a flowchart of details of an autonomous driving control process performed by a calculation control unit according to a third embodiment.

FIG. 13 is a flowchart of details of an autonomous driving control process according to the present embodiment. The flowchart in FIG. 13 is the flowchart in FIG. 4 to which steps 105 and S115 are added. Step S105 is set between steps S100 and S110. Step S115 is set between steps S105 and S120.

The calculation processing unit 11 performs the autonomous driving control process based on the flowchart in FIG. 13 replacing FIG. 4.

First, at step S100, the calculation processing unit 11 makes an YES determination when an object is present in front of the preceding vehicle in the vehicle advancing direction.

Then, at step S105, the calculation processing unit 11 as the speed determining unit determines whether the speed of the own vehicle 100 is equal to or greater than the threshold based on the output signal of the vehicle speed sensor 55.

At this time, when the speed of the own vehicle 100 is equal to or greater than the threshold, at step S105, the calculation processing unit 11 makes an YES determination. In accompaniment, at step S110, the calculation processing unit 11 performs prefill control and engine brake control and then proceeds to subsequent step S120.

In addition, when the speed of the own vehicle 100 is less than the threshold, at step S105, the calculation processing unit 11 makes a NO determination. In accompaniment, at step S115, the calculation processing unit 11 prohibits execution of prefill control and engine braking, and then proceeds to step S120. Subsequently, the calculation processing unit 11 performs the autonomous driving control process in a manner similar to that according to the first embodiment. Step S115 configures a speed determination prohibiting unit.

According to the present embodiment described above, the calculation processing unit 11 prohibits execution of prefill control and engine braking when the speed of the own vehicle is less than the threshold. Therefore, when the speed of the own vehicle is less than the threshold, unnecessary prefill control and engine braking can be prevented in advance from being executed.

Fourth Embodiment

According to the above-described third embodiment, an example in which the calculation processing unit 11 determines whether to perform prefill control and engine braking by determining whether the speed of the own vehicle is equal to or greater than a threshold is described.

Instead, according to the present fourth embodiment, an example in which the calculation processing unit 11 determines whether to perform prefill control and engine braking by determining whether a relative speed between the own vehicle and an object is equal to or greater than a predetermined speed will be described with reference to FIG. 14.

Figure 14:
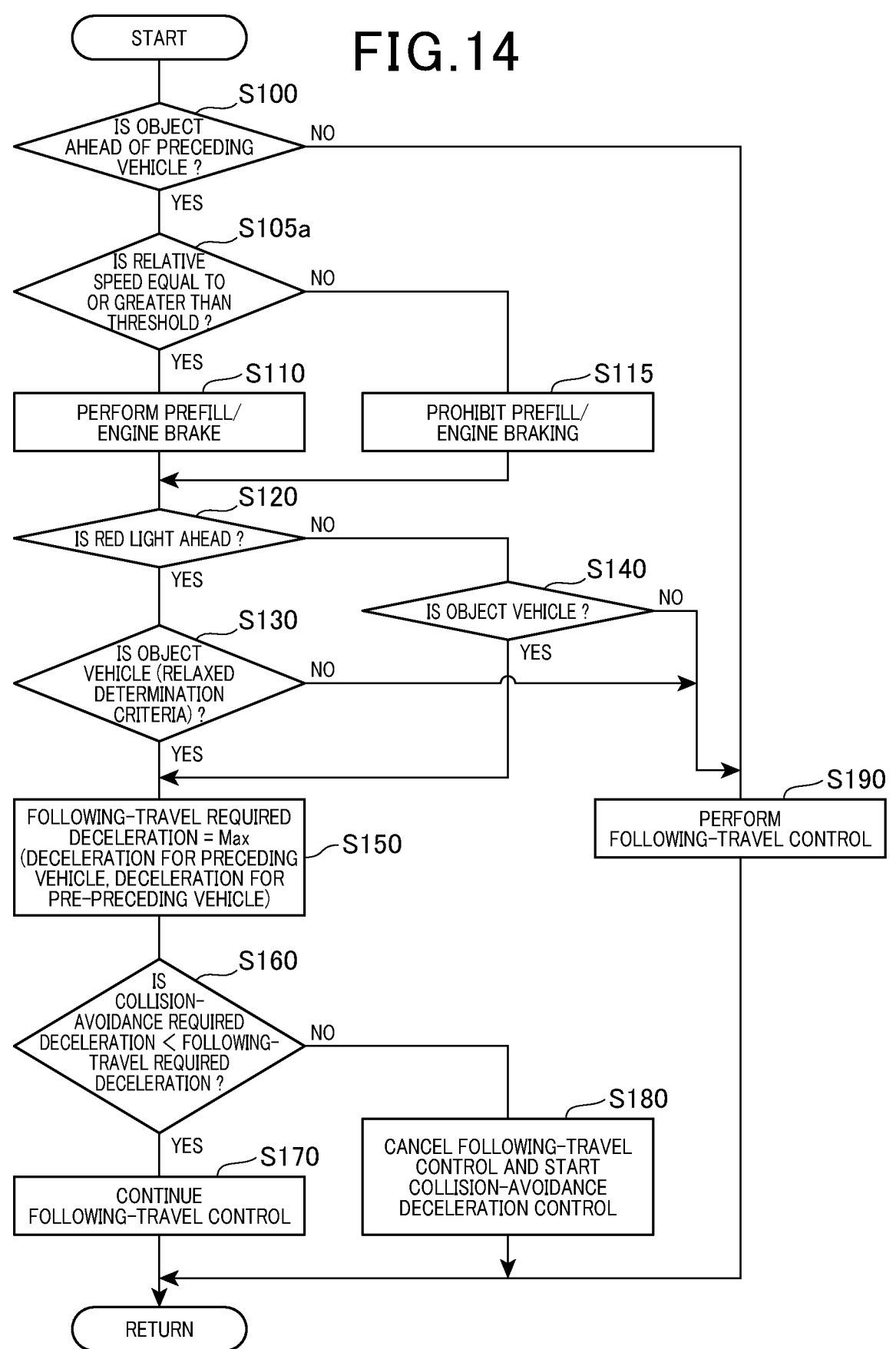
FIG. 14 is a flowchart of details of an autonomous driving control process performed by a calculation control unit according to a fourth embodiment.

FIG. 14 is the flowchart in FIG. 13 including step S105a replacing step S105. Steps other than step S105a in the flowchart in FIG. 14 are identical to those in the flowchart in FIG. 13.

The calculation processing unit 11 performs the autonomous control process based on the flowchart in FIG. 14 replacing FIG. 13.

Then, at step S105a, the calculation processing unit 11 as a relative speed determining unit determines the relative speed between the object and the own vehicle based on the output signal of the vehicle speed senor 55 and the output signal of the monitoring sensor 50, and determines whether the relative speed is equal to or greater than a threshold.

At this time, when the relative speed is equal to or greater than the threshold, at step S105a, the calculation processing unit makes an YES determination. In accompaniment, at step S110, the calculation processing unit 11 performs prefill control and engine brake, and proceeds to subsequent step S120.

In addition, when the relative speed is less than the threshold, at step S105a, the calculation processing unit 11 makes a NO determination. In accompaniment, at step S115, the calculation processing unit 11 prohibits execution of prefill control and engine braking, and then proceeds to step S120. Subsequently, the calculation processing unit 11 performs the autonomous driving control process in a manner similar to that according to the first embodiment. Step S115 configures a relative-speed determination prohibiting unit.

According to the present embodiment described above, when the relative speed is less than the threshold, the calculation processing unit prohibits execution of prefill control and engine braking. Therefore, when the relative speed between the object and the own vehicle is less than the threshold, unnecessary prefill control and engine braking can be prevented in advance from being executed.

Fifth Embodiment

According to the above-described fourth embodiment, an example in which the calculation processing unit 11 determines whether to perform prefill control and engine braking by determining whether the relative speed is equal to or greater than a threshold is described.

Instead, according to the present fifth embodiment, an example in which the calculation processing unit 11 determines whether to perform prefill control and engine braking by determining whether an estimated collision time is equal to or greater than a threshold is described with reference to FIG. 15. The estimated collision time indicates Time-To-Collision and is a predicted collision time predicted to be required for the own vehicle to collide with the object.

Figure 15:
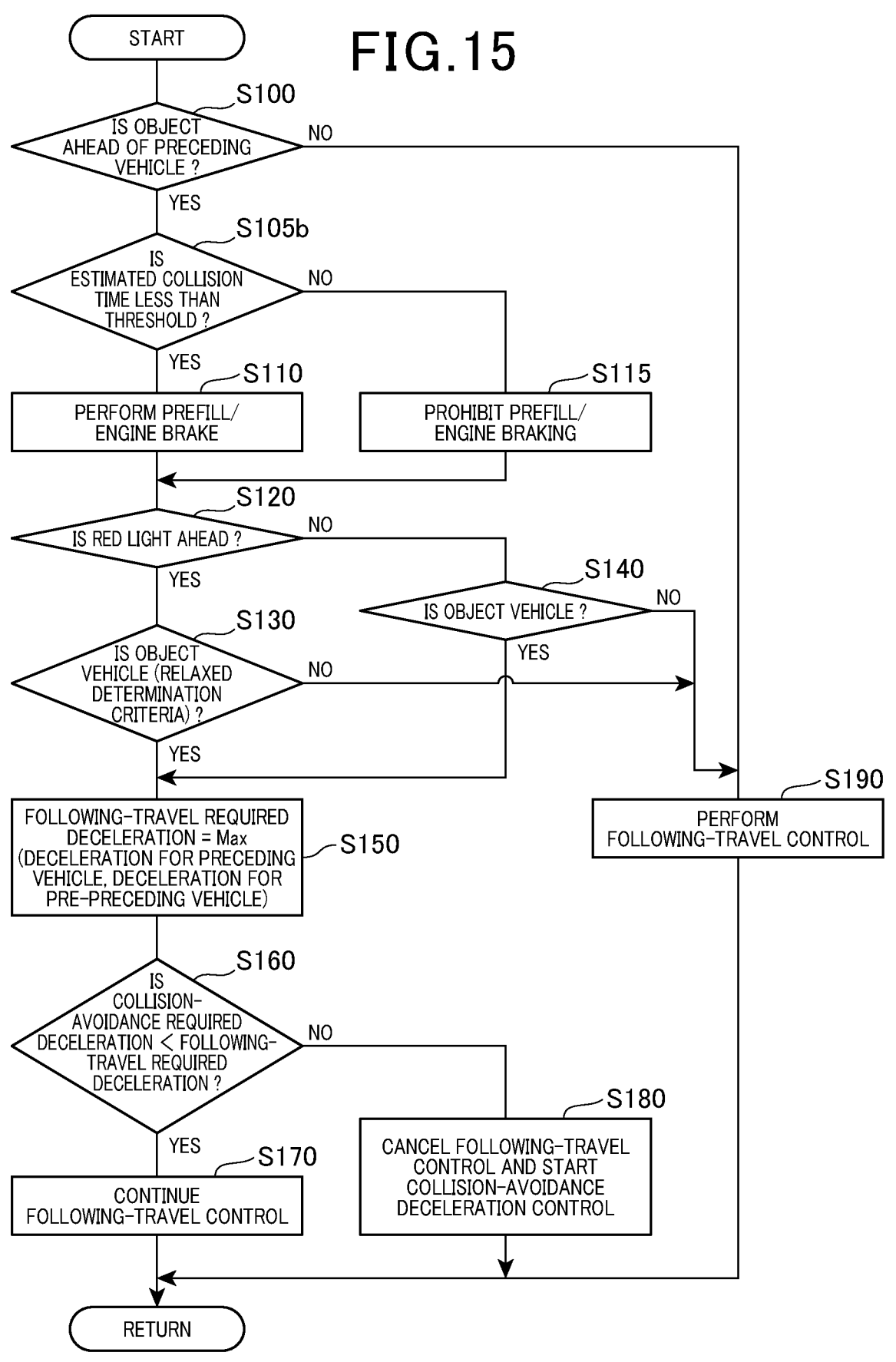
FIG. 15 is a flowchart of details of an autonomous driving control process performed by a calculation control unit according to a fifth embodiment.

FIG. 15 is the flowchart in FIG. 14 including step S105b replacing step S105a. Steps other than step S105b in the flowchart in FIG. 15 are identical to those in the flowchart in FIG. 14.

The calculation processing unit 11 performs the autonomous driving control process based on the flowchart in FIG. 15 replacing FIG. 14.

At step S105b, the calculation processing unit 11 as a time determining unit determines whether the estimated collision time is less than the threshold based on the output signal of the vehicle speed sensor 55 and the output signal of the monitoring sensor 50. The estimated collision time is determined by "a distance between the own vehicle and an object" being divided by "a relative speed between the own vehicle and the object".

At this time, when the estimated collision time is less than the threshold, at step S105b, the calculation processing unit 11 makes an YES determination. In accompaniment, at step S110, the calculation processing unit 11 performs prefill control and engine braking, and then proceeds to the subsequent step S120.

In addition, when the estimated collision time is equal to or greater than the threshold, at step S105b, the calculation processing unit 11 makes a NO determination. In accompaniment, at step S115, the calculation processing unit 11 prohibits execution of prefill control and engine braking, and then proceeds to the subsequent step S120. Subsequently, the calculation processing unit 11 performs the autonomous driving control process in a manner similar to that according to the above-described first embodiment. Here, step S115 configures a time determination prohibiting unit.

According to the present embodiment described above, when the estimated collision time is equal to or greater than the threshold, the calculation processing unit 11 prohibits execution of prefill control and engine braking. Therefore, when the estimated collision time is equal to or greater than the predetermined amount of time, unnecessary prefill control and engine braking can be prevented in advance from being executed.

OTHER EMBODIMENTS (1) According to the above-described first to fifth embodiments, an example in which the calculation processing unit 11 configures the autonomous driving control process by software using a computer program is described. However, in the calculation processing unit 11, the autonomous driving control process may be configured by hardware.

(2) According to the above-described first to fifth embodiments, an example in which the brakes of the wheels 38a, 38b, 38c, and 38d are configured by the disc brakes 70, 71, 72, and 73 is described. However, this is not limited thereto. The brake of any or all of the wheels 38a, 38b, 38c, and 38d may be configured by a drum brake.

(3) According to the above-described first to fifth embodiments, an example in which, as prefill control, respective brake pads of the disc brakes 70, 71, 72, and 73 are in a non-contact state with the brake discs is described.

However, instead, as prefill control, the brake pads 70a, 70b, 71a, 72b, 73a, and 73b may be in a state of slight contact with the disc brakes 70c, 71c, 72c, and 73c.

(4) According to the above-described second embodiment, an example in which, at step S260, the calculation processing unit 11 causes the own vehicle to avoid the preceding vehicle by steering is described. However, instead, the own vehicle may avoid an object such as a fallen object on the road by steering.

(5) According to the above-described first, third, fourth, and fifth embodiments, an example in which the calculation processing unit 11 performs prefill control and engine braking at step S110 is described. However, instead, step S110 in which prefill control and engine braking are performed may be eliminated. Alternatively, only either of prefill control and engine braking may be performed at step S110.

(6) Here, the present disclosure is not limited to the above-described embodiments and may be modified as appropriate. In addition, the above-described first, second, third, fourth, and fifth embodiments are not unrelated to one another and may be combined as appropriate excluding cases in which combinations are clearly not possible.

For example, the autonomous driving control process may be configured by two or more of step S105 according to the above-described third embodiment, step S105a according to the above-described fourth embodiment, and step S105b according to the above-described fifth embodiment being combined.

In addition, the calculation processing unit, the electronic control apparatus, and the methods thereof described in the present disclosure may be actualized by a dedicated computer that is provided such as to be configured by a processor and a memory, the processor being programmed to provide one or a plurality of functions that are realized by a computer program. Alternatively, the calculation processing unit, the electronic control apparatus, and the methods thereof described in the present disclosure may be actualized by a dedicated computer that is provided by a processor being configured by a single dedicated hardware logic circuit or more. Still alternatively, the calculation processing unit, the electronic control apparatus, and the methods thereof described in the present disclosure may be actualized by a single dedicated computer or more. The dedicated computer may be configured by a combination of a processor that is programmed to provide one or a plurality of functions, a memory, and a processor that is configured by a single hardware logic circuit or more. In addition, the computer program may be stored in a non-transitory, tangible storage medium that can be read by a computer as instructions performed by the computer.

What is claimed is:

1. A vehicle control apparatus that is applicable to a vehicle including a monitoring sensor that monitors a front side of an own vehicle in a vehicle advancing direction and a brake apparatus that brakes the own vehicle, the vehicle control apparatus comprising:

a vehicle determining unit that determines whether a pre-preceding vehicle is present in front of a preceding vehicle in the vehicle advancing direction, the preceding vehicle being positioned in front of the own vehicle in the vehicle advancing direction;

a following control unit that, in response to the vehicle determining unit determining that the pre-preceding vehicle is present in front of the preceding vehicle in the vehicle advancing direction, compares a first required deceleration that is deceleration required to cause the own vehicle to travel so as to follow the preceding vehicle based on a monitoring result of the monitoring sensor monitoring the preceding vehicle and a second required deceleration that is deceleration required to cause the own vehicle to travel so as to follow the pre-preceding vehicle based on a monitoring result of the monitoring sensor monitoring the pre-preceding vehicle, and controls the brake apparatus to bring deceleration of the own vehicle closer to the second required deceleration in response to the second required deceleration being greater than the first required deceleration;

an object determining unit that determines whether an object is detected in front of the preceding vehicle in the vehicle advancing direction; and a prefill control unit that controls the brake apparatus, wherein the vehicle determining unit determines whether the object is the pre-preceding vehicle by determining whether the pre-preceding vehicle is present in front of the preceding vehicle in the vehicle advancing direction, the brake apparatus includes a pump that compresses and ejects brake fluid, and a plurality of brakes that brake a plurality of wheels of the own vehicle by pressure of the brake fluid ejected from the pump, the prefill control unit controls the pump so that the brake fluid is compressed by the pump and ejected toward the plurality of brakes from when the object determining unit determines that the object is detected until the vehicle determining unit determines that the object is the pre-preceding vehicle, and in response to the object determining unit determining that the object is detected and the vehicle determining unit determining that the object is the pre-preceding vehicle, the following control unit controls the pump so that the pressure of the brake fluid ejected from the pump towards the plurality of brakes further increases and thereby controls the brake apparatus to bring the deceleration of the own vehicle closer to the second required deceleration.

2. The vehicle control apparatus according to claim 1, further comprising:

a speed determining unit that determines whether a speed of the own vehicle is less than a threshold; and a speed determination prohibiting unit that prohibits execution of the prefill control unit in response to the object determining unit determining that the object is detected and the speed determining unit determining that the speed of the own vehicle is less than the threshold.

3. The vehicle control apparatus according to claim 2, further comprising:

a relative speed determining unit that determines whether a relative speed of the own vehicle to the object is less than a threshold; and a relative-speed determination prohibiting unit that prohibits execution of the prefill control unit in response to the object determining unit determining that the object is detected and the relative speed determining unit determining that the relative speed is less than the threshold.

4. The vehicle control apparatus according to claim 3, further comprising:

a time determining unit that determines whether an estimated collision time is equal to or greater than a threshold, the estimated collision time being estimated to be required for the own vehicle to collide with the object; and a time-determination prohibiting unit that prohibits execution of the prefill control unit in response to the object determining unit determining that the object is detected and the time determining unit determining that the estimated collision time is equal to or greater than the threshold.

5. The vehicle control apparatus according to claim 1, further comprising:

a relative speed determining unit that determines whether a relative speed of the own vehicle to the object is less than a threshold; and a relative-speed determination prohibiting unit that prohibits execution of the prefill control unit in response to the object determining unit determining that the object is detected and the relative speed determining unit determines that the relative speed is less than the threshold.

6. The vehicle control apparatus according to claim 1, further comprising:

a time determining unit that determines whether an estimated collision time is equal to or greater than a threshold, the estimated collision time being estimated to be required for the own vehicle to collide with the object; and a time-determination prohibiting unit that prohibits execution of the prefill control unit in response to the object determining unit determining that the object is detected and the time determining unit determining that the estimated collision time is equal to or greater than the threshold.

7. The vehicle control apparatus according to claim 1, further comprising:

a red light determining unit that determines whether a traffic light displaying a red light toward the own vehicle is present in front of the own vehicle in the vehicle advancing direction, wherein in response to the red light determining unit determining that the traffic light is present in front of the own vehicle in the vehicle advancing direction, determination criteria of the vehicle determining unit is relaxed compared to when the red light determining unit determines that the traffic light is not present in front of the own vehicle in the vehicle advancing direction.

8. A vehicle control apparatus that is applicable to a vehicle including a monitoring sensor that monitors a front side of an own vehicle in a vehicle advancing direction and a brake apparatus that brakes the own vehicle, the vehicle control apparatus comprising:

a deceleration determining unit that determines whether a second required deceleration that is deceleration required for the own vehicle to avoid collision with a preceding vehicle by deceleration based on a monitoring result of the monitoring sensor monitoring the preceding vehicle is greater than a first required deceleration that is deceleration required for the own vehicle to travel so as to follow the preceding vehicle based on the monitoring result of the monitoring sensor monitoring the preceding vehicle, the preceding vehicle traveling in front of the own vehicle in the vehicle advancing direction; and a deceleration control unit that controls the brake apparatus to bring the deceleration of the own vehicle closer to the second required deceleration in response to the deceleration determining unit determines that the second required deceleration is greater than the first required deceleration.

* * * * *